(No Model.)

F. M. MOTT.
FAUCET.

No. 503,666. Patented Aug. 22, 1893.

Witnesses

Inventor
Frank M. Mott.
By his Attorneys,

UNITED STATES PATENT OFFICE.

FRANK M. MOTT, OF PERRIS, CALIFORNIA, ASSIGNOR OF ONE-HALF TO JOHN McLAREN, OF SAME PLACE.

FAUCET.

SPECIFICATION forming part of Letters Patent No. 503,666, dated August 22, 1893.

Application filed May 3, 1892. Serial No. 431,687. (No model.)

*To all whom it may concern:*

Be it known that I, FRANK M. MOTT, a citizen of the United States, residing at Perris, in the county of San Diego and State of California, have invented a new and useful Faucet, of which the following is a specification.

This invention relates to faucets; and it has for its object to provide an improved faucet which is designed to be used to draw off the liquids from tin or other thin metal cans or vessels, and the same is designed to be so constructed as to provide means for both piercing the hole in the vessel to which it is to be attached, and at the same time giving a perfectly tight joint when it is secured to the vessel.

To this end it is the main object of the invention to improve upon faucets of this character.

With these and many other objects in view which will readily appear as the nature of the invention is better understood, the same consists in the novel construction, combination and arrangement of parts hereinafter more fully described, illustrated and claimed.

Figure 1:
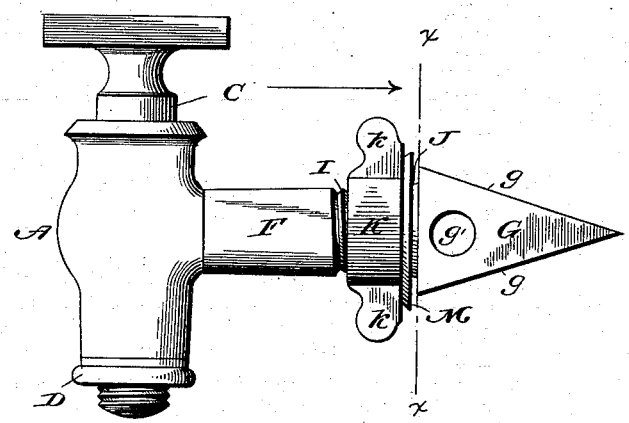
Figure 2:
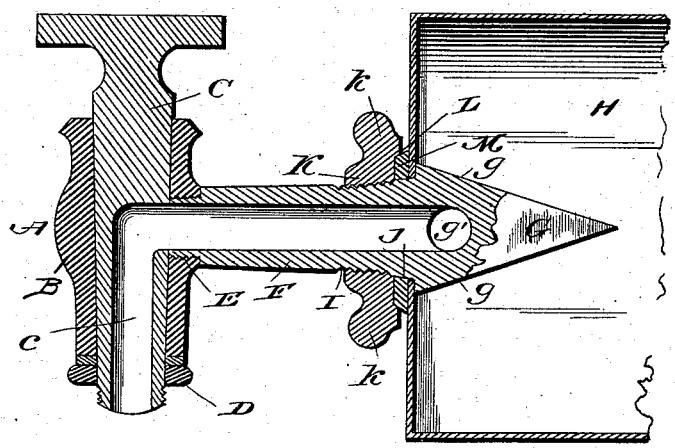
Figure 3:
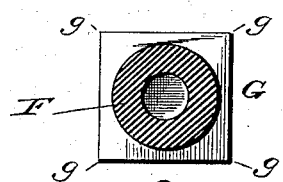

In the accompanying drawings:—Figure 1 is a side elevation of a faucet constructed in accordance with this invention. Fig. 2 is a vertical longitudinal sectional view of the same inserted in a vessel. Fig. 3 is a vertical cross-section in rear of the conical piercing head on line $x$—$x$ of Fig. 1.

Referring to the accompanying drawings:— A represents a faucet having the cylindrical plug casing B, within which is mounted the turning plug or cock C, provided with the longitudinally disposed fluid passage c, opening through the lower end of said plug which is surrounded by the ordinary nut and washer D, fitted over the lower end of the plug or valve casing and plug to hold the said plug in position within its casing. One side of the faucet plug casing is provided with a threaded opening E, which receives the outer threaded end of the separate and detachable faucet tail pipe or stem F, which may be thus removably connected with the body of the faucet, while at the same time allowing for the flow of liquid therethrough into the fluid passage of the plug. The other end of the tail pipe or stem F is provided with or terminates in an integral pyramidal piercing head G, the four corners or edges $g$ of which, being designed to form cutting edges to cut the metal of the can H, which is pierced by said head which is angular in cross section. The said piercing head G is provided with the lateral openings $g'$, opening into the pipe F, so as to lead the fluid from the vessel through the faucet. Directly in rear of the base of said head G the tail pipe or stem F is provided with an exteriorly threaded portion I, extending up near to said head at which point the said pipe is further provided with a beveled or swelled shoulder J which rises from said threads to the base of the piercing head said tail stem being necessarily tapered from end to end to provide for the integral enlarged constructions just described. A clamping thumb nut K, engages the threaded portion of the faucet pipe and is provided in one face thereof with the annular seat L which receives the gasket M. The said gasket M may be made of any suitable material and being slightly larger than the threaded portion of the pipe F is designed to easily slip over said threaded portion and fit tightly over the beveled shoulder J and against the side of the vessel to which the faucet is attached, the side of the vessel being clamped between said gasket and the shoulder formed at the base of the head G as will be readily apparent. The thumb nut K is provided with the ordinary wings $k$, by means of which the same may be readily grasped for screwing the same against the side of the vessel to clamp the faucet in position.

To place the faucet upon a vessel, the pyramidal head of the same is sharply forced through one side of the vessel thus making an opening for the escape of the fluid. The faucet is inserted in the vessel until the thumb nut stops farther insertion, and then the faucet is turned one-eighth round so that the base of the head will engage the inner wall of the can. The thumb screw carrying the gasket is now securely screwed up tightly against the upper face of the vessel to hold the faucet in position and to provide a perfectly tight joint.

Having thus described my invention, what I claim, and desire to secure by Letters Patent, is—

The herein described improved faucet consisting of a bored plug casing having a threaded opening at one side, a rotatable plug mounted in the bored casing and having a passage communicating with the threaded perforation, the bored stem or tail pipe threaded at and reduced toward its front end and inserted into the plug casing and having its rear end terminating in an enlarged integral pyramidal head forming a series of inclined cutting edges at the four corners thereof which converge to a common piercing point and which serve to pierce the vessel with an even unlacerated squared opening, said head having transverse perforations communicating with the bore of the stem, and the stem in front of the base of the head being inclined or shouldered and in rear thereof provided with threads, a packing ring or gasket encircling the inclination or shoulder, and a counter-sunk thumb nut threaded on the stem and binding against the gasket, substantially as set forth.

In testimony that I claim the foregoing as my own I have hereto affixed my signature in the presence of two witnesses.

FRANK M. MOTT.

Witnesses:
A. A. HENDERSON,
A. L. BECCH.